United States Patent
Gloss et al.

(10) Patent No.: US 10,627,560 B2
(45) Date of Patent: Apr. 21, 2020

(54) OPTICAL SYSTEM FOR LIGHTING EQUIPMENT, ESPECIALLY FOR A SIGNAL LAMP FOR MOTOR VEHICLES

(71) Applicant: Varroc Lighting Systems, s.r.o., Senov u Noveho Jicina (CZ)

(72) Inventors: Tomas Gloss, Vitkov (CZ); Vit Simurda, Novy Jicin (CZ); Jakub Hruska, Hlucin (CZ)

(73) Assignee: Varroc Lighting Systems, S.R.O., Senov u Noveho (CZ)

( * ) Notice: Subject to any disclaimer, the term of this patent is extended or adjusted under 35 U.S.C. 154(b) by 2 days.

(21) Appl. No.: 16/025,587

(22) Filed: Jul. 2, 2018

(65) Prior Publication Data
US 2019/0011626 A1    Jan. 10, 2019

(30) Foreign Application Priority Data

Jul. 10, 2017   (CZ) .................................... 2017-398

(51) Int. Cl.
*F21V 8/00* (2006.01)
*B60Q 1/26* (2006.01)
(Continued)

(52) U.S. Cl.
CPC ............. *G02B 6/0016* (2013.01); *B60Q 1/26* (2013.01); *F21S 43/14* (2018.01); *F21S 43/15* (2018.01);
(Continued)

(58) Field of Classification Search
CPC .... G02B 6/0016; F21S 43/243; F21S 43/249; F21S 43/14; F21S 43/15; B60Q 1/26
See application file for complete search history.

(56) References Cited

U.S. PATENT DOCUMENTS

| | | | |
|---|---|---|---|
| 6,924,943 B2 | 8/2005 | Minano et al. | |
| 7,286,296 B2 * | 10/2007 | Chaves | F21S 43/251 359/641 |

(Continued)

FOREIGN PATENT DOCUMENTS

| | | |
|---|---|---|
| CZ | 2010-602 A3 | 2/2012 |
| CZ | 20110359 A3 | 12/2012 |

(Continued)

OTHER PUBLICATIONS

Search Report from Corresponding Czech Application No. PV 2017-398 dated Apr. 9, 2018 (3 pages).

*Primary Examiner* — Anh T Mai
*Assistant Examiner* — Michael Chiang
(74) *Attorney, Agent, or Firm* — Hovey Williams LLP

(57) ABSTRACT

An optical system for a lighting device, comprising a light-guiding optical part configured for spreading light beams generated by light sources situated opposite to a rear side of the optical part. Light beams are coupled into the light-guiding optical part, and after passing through the light-guiding optical part the light beams are emitted through its output surface. Rear side of light-guiding optical part is equipped with macroscopic cavities, each pair of adjacent macroscopic cavities forming between themselves an optical segment, whose two sides, which separate the optical segment from the pair of macroscopic cavities, comprise a reflective surface. The optical segment comprises a rear surface on the rear side, opposite to which a light source is positioned. The reflective surfaces are configured for reflecting a part of the light beams, which were coupled through the rear surface into the optical segment, and then directing them to the output surface.

12 Claims, 3 Drawing Sheets

(51) Int. Cl.
*F21S 43/249* (2018.01)
*F21S 43/243* (2018.01)
*F21S 43/14* (2018.01)
*F21S 43/239* (2018.01)
*F21S 43/15* (2018.01)

(52) U.S. Cl.
CPC ........... *F21S 43/239* (2018.01); *F21S 43/243* (2018.01); *F21S 43/249* (2018.01); *G02B 6/0018* (2013.01); *G02B 6/0031* (2013.01); *G02B 6/002* (2013.01); *G02B 6/0041* (2013.01)

(56) References Cited

U.S. PATENT DOCUMENTS

| | | | | |
|---|---|---|---|---|
| 8,033,706 B1* | 10/2011 | Kelly | .................. | G02B 6/0036 362/307 |
| 8,998,475 B2* | 4/2015 | Yuki | ..................... | G02B 6/002 362/611 |
| 2004/0207775 A1* | 10/2004 | Min | ..................... | G02B 6/0016 349/65 |
| 2006/0285347 A1* | 12/2006 | Okada | .................. | F21S 41/143 362/516 |
| 2007/0290829 A1* | 12/2007 | Geiger | ................ | B60Q 1/2665 340/475 |
| 2012/0033441 A1 | 2/2012 | Sousek et al. | | |
| 2015/0241616 A1* | 8/2015 | Bungenstock | ....... | G02B 6/0021 362/511 |
| 2016/0004002 A1* | 1/2016 | Yoshida | ............. | B29D 11/0048 362/511 |
| 2016/0085017 A1 | 3/2016 | Irgang et al. | | |
| 2016/0109098 A1* | 4/2016 | Martoch | .................. | F21S 43/14 362/517 |
| 2016/0186950 A1* | 6/2016 | Grosdidier | ............... | B60Q 3/64 362/511 |
| 2016/0195234 A1 | 7/2016 | Mateju et al. | | |
| 2016/0265732 A1* | 9/2016 | Jacquemin | ............. | F21S 41/29 |
| 2017/0336041 A1* | 11/2017 | Mochizuki | ........... | B60Q 1/0011 |
| 2018/0149330 A1 | 5/2018 | Gloss et al. | | |

FOREIGN PATENT DOCUMENTS

| | | |
|---|---|---|
| CZ | 305 740 B6 | 2/2016 |
| CZ | 2016-741 A3 | 6/2018 |
| DE | 10234110 A1 | 2/2004 |

\* cited by examiner

OPTICAL SYSTEM FOR LIGHTING EQUIPMENT, ESPECIALLY FOR A SIGNAL LAMP FOR MOTOR VEHICLES

RELATED APPLICATIONS

This application claims the priority benefit of Czech Patent Application Serial No. PV 2017-398 filed on Jul. 10, 2017, the entire disclosure of which is herein incorporated by reference.

FIELD OF THE INVENTION

The invention concerns an optical system for lighting equipment, especially for a signal lamp for motor vehicles. The optical system according to the invention is adapted to create light effects or other light design elements.

BACKGROUND INFORMATION

With the development of new materials and more demanding design requirements, there has been a growing tendency to use materials providing a volumetric light dispersion. Using this material will ensure an uncommon appearance, and it can be used for the creation of interesting effects. In a system, this material is often used as a thin light guide. For example, planar light guides made of a light-guiding material containing diffusion particles for light beam dispersion are known from documents CZ305740 and CZ201607411. A disadvantage of using a material with diffusion particles is a fact that using materials which volumetrically disperse light often reduces luminous efficiency of an optical system, which makes it difficult to comply with photometric requirements for a lighting equipment.

When using the planar light guide made of a volumetrically dispersive material, the light must be connected through the input area, or the edge. To ensure the necessary efficiency, the input area of the light guide may be shaped so that light sources lie at different PCB, which ensures a suitable light direction from the source. However, a larger number of PCB increases the price and the risk of failure rate of the optical system. Collimation optical elements situated near the light source contribute to the assurance of the required optical system efficiency. Documents CZ20100602, US20150241616, DE10234110, U.S. Pat. No. 6,924,943, and CZ20110359 describe various collimation systems, however these collimation systems or optical elements are difficult to be used, with regard to their spatial layout and requirements for installation area, for ultra thin planar light guides or ultra thin follow-up areas of planar light guides. Moreover, when using materials which volumetrically disperse light, the resulting stylistic effect and homogeneity of the resulting light trace can be disturbed by a collimated light beam of rays.

The goal of the present invention is to design light equipment, especially a signal lamp for motor vehicles, which makes light patterns, wherein the optical system of the light equipment may both include a planar light guide with a preferable maximum thickness up to 5 mm, and more preferably to a maximum thickness of 3 mm, preferably containing particles volumetrically dispersing light, and it has low demands for installation, whereas output light functions are preferably homogeneous and light radiation is easily producible at low cost

SUMMARY OF THE INVENTION

The aforementioned goals of the present invention are satisfied by an optical system for lighting equipment, in particular a signal lamp for motor vehicles, including a light-guiding optical part configured for spreading light beams generated by light sources situated opposite to its rear side, through which light beams are connected to a light-guiding optical part, and emitted through its output area after the passage through the light-guiding optical part. The rear side of the light-guiding optical part is equipped with macroscopic cavities, where each pair of adjacent macroscopic cavities forms mutually an optical segment, whose two sides which separate it from the said pair of macroscopic cavities, contain a reflexive area, and the optical segment contains a rear area on the rear side, against which a light source is situated, whereas reflexive areas are configured for the reflection of a part of light beams which have been connected via the rear area to the optical segment, and directing them to the output area.

In accordance with one of the embodiments, the light-guiding optical part contains dispersive elements for diffusion dispersion in its inner structure.

In accordance with one of the embodiments, one reflective surface of each pair of reflective areas defining the optical segment is of a concave shape when viewed from the inside of the optical segment, while the other surface of this pair of reflective surfaces is of a convex shape when viewed from the inside of the optical segment.

In accordance with one of the embodiments, exactly one light source is situated opposite to each rear area, to emit the luminous flux of light beams within the dispersion limit from a longitudinal axis of the luminous flux.

In accordance with one of the embodiments, the light source is situated in fact in the source focus point of the concave reflective surface of the optical segment the light source is assigned to.

In accordance with one of the preferable embodiments the rear area of at least any of the optical segment is in the plane which is not perpendicular to the optical axis, and/or the longitudinal axis of at least any luminous flux is not parallel with the optical axis.

In accordance with another of the embodiments, the reflective surface of at least any of the optical segments is inclined towards the longitudinal axis of the luminous flux emitted to this optical segment so that light beams are directed in the direction of the optical axis, and/or in the direction close to the optical axis direction after their refraction on the output surface.

In accordance with another of the embodiments, all optical segments are of the same shape and size, and longitudinal axes of luminous fluxes emitted to all optical segments have identical direction.

In accordance with another of the embodiments, rear areas of all optical segments lie at the same plane.

In accordance with another of the embodiments, all macroscopic cavities have the same width along their entire length.

In accordance with another of the embodiments, at least one of optical segments differs from any of the other optical segments in its shape and/or its size.

In accordance with another of the embodiments, at least one of optical segments differs from any of the other optical segments in its length of the reflective surface, and/or direction of the plane in which the rear area of the optical segment is situated, and/or a shape of reflective surfaces, and/or a direction of the longitudinal axis from the luminous flux.

The submitted solution easily achieves a new and higher efficiency by the fact that it is partial collimation of light at the entry to the optical system, which enables it to direct light to the required photometric points without disturbing the appearance of the system and its homogeneity even when using materials which volumetrically disperse light, and with arbitrary shape of a signal lamp. This is enabled by the fact that the size of the collimation element and its focal distance can be changed according to stylistic possibilities and requirements.

BRIEF DESCRIPTION OF THE DRAWINGS

The invention will be explained in detail by means of its examples of embodiments with references to the drawings attached, in which.

EXAMPLES OF INVENTION EMBODIMENTS

Figure 1:
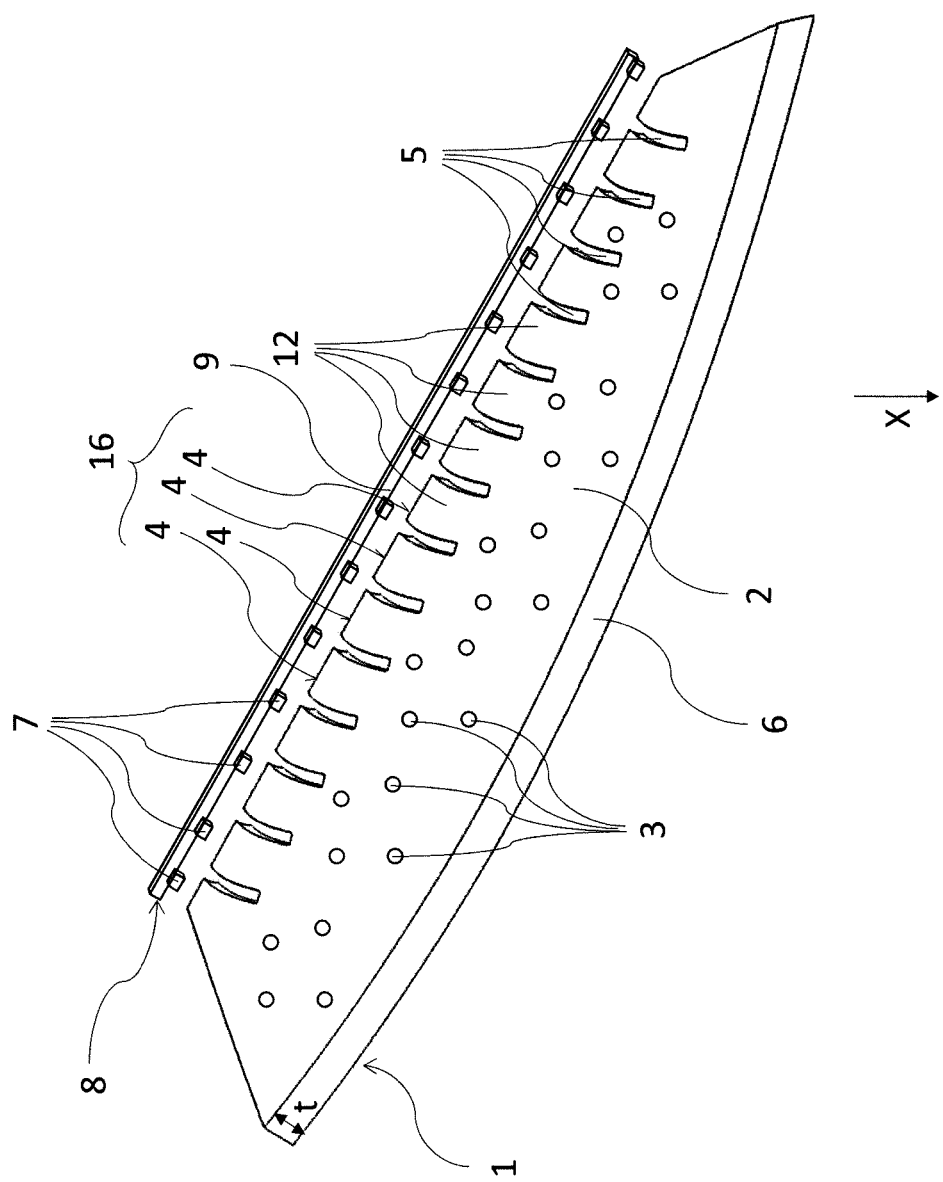
FIG. 1 shows the first example of an embodiment of the optical system according to the invention.
Figure 2:
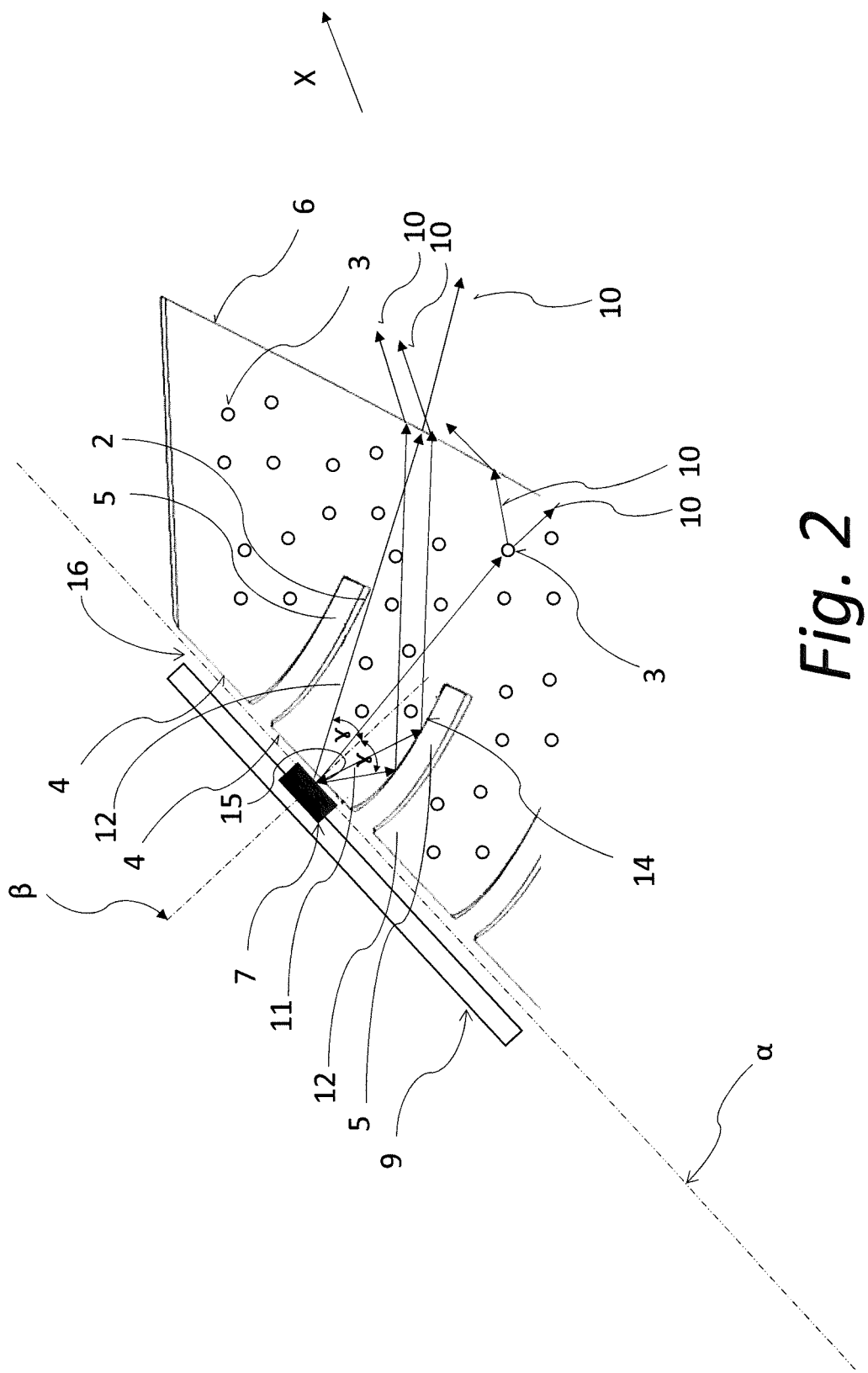
FIG. 2 shows a detail of FIG. 1.

According to FIG. 1, the first example of an embodiment of the optical system according to the invention contains a light-guiding optical part 1 of a plate-like shape in the form of a flat shaped planar light guide with a thickness t, and can contain in its inner structure 2 volumetrically dispersed elements 3 for diffusion dispersion of light beams 10 not shown herein (shown in FIG. 2). The outer housing of the light-guiding optical part 1 comprises rear surfaces 4 on the rear side 16 of the light-guiding optical part 1, and a front output surface 6 in the front, whereas a maximum thickness t of the light-guiding optical part 1 can be 5 mm, or can be no more than 3 mm. At its rear side 16, the light-guiding optical part 1 is equipped with macroscopic cavities 5 for directing light beams 10 not shown herein (shown in FIG. 2) and then guiding them towards the output surface 6 and through the output surface 6 out of the light-guiding optical part 1. The light-guiding optical part 1 can be made as a single piece by plastic injection moulding to a mould, and volumetrically dispersive elements 3 are preferably additives in the form of diffusion particles already contained in the plastic material before the injection moulding process. Opposite the rear side of the light-guiding optical part 1 there is an illuminating device 8 comprising a set of light sources 7 situated on a carrier 9. Exactly one light source 7 is preferably situated opposite to each rear surface 4.

According to FIG. 2 which shows a detail of the optical system shown in FIG. 1, one light source 7 is preferably assigned to each optical segment 12 created between two macroscopic cavities 5. This optical segment 12 is further equipped with an input connecting rear surface 4, which is inclined to axis α, which is parallel to the rear surface 4. Light sources 7 are adapted for emitting a beam of light rays 10—luminous flux 11 to the inner structure 2 of the light-guiding optical part 1 in the direction of axis β of the luminous flux 11, with dispersion γ from this axis β. Each macroscopic cavity 5 is earmarked on the sides by a pair of reflective surfaces 14, where one of the pair of reflective surfaces 14 when viewed from the inside of the macroscopic cavity 5 can, e.g., be of a convex and the other of a concave shape, e.g. in the shape of a parabola, wherein the light source 7 can be situated in fact in the source focal point 15 of the reflective surface 14, whereas the light source 7 is preferably a Lambert's source. Reflective surfaces 14 are preferably inclined against axis β to deflect light beams 10 to the direction of the optical axis X, or to the direction near to the direction of the optical axis X, or so that after refraction on the output surface 6 at least a part of beams 10 goes out in the direction of the optical axis X.

Figure 3:
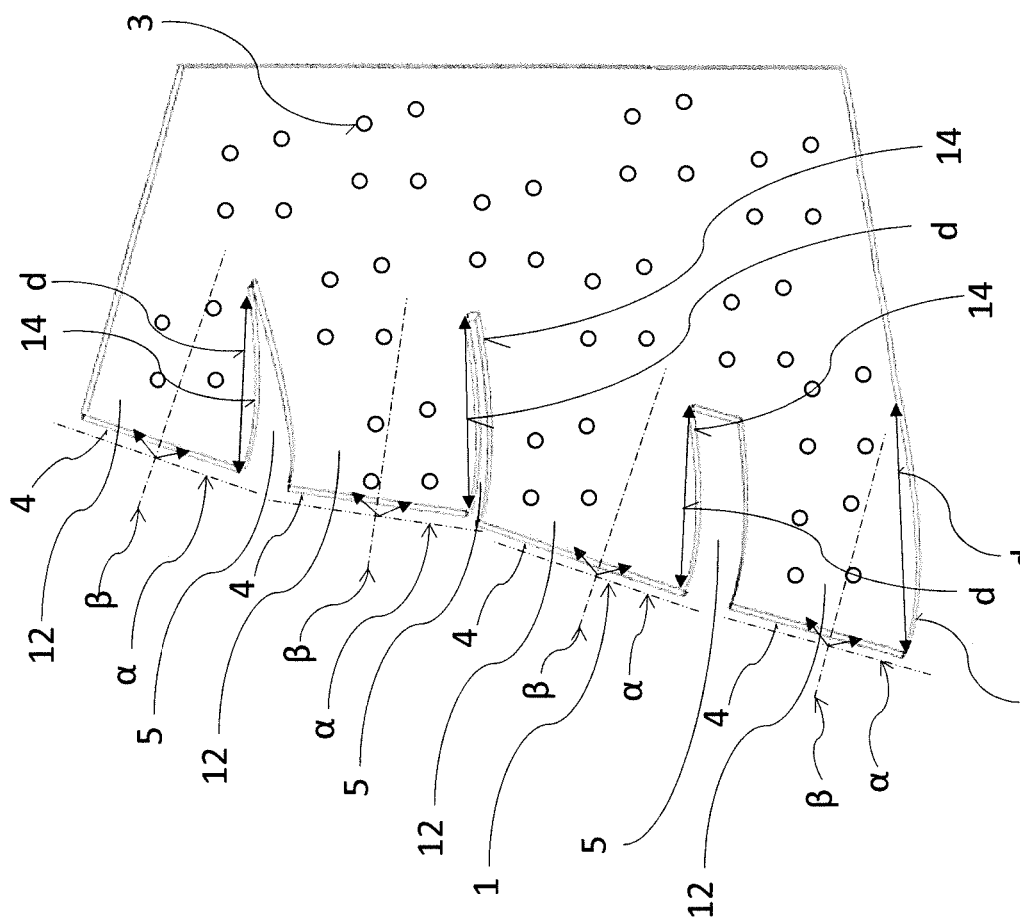
FIG. 3 shows the second example of an embodiment of the optical system according to the invention.

According to FIG. 3, which shows a second example of embodiment of the optical system according to this invention, individual macroscopic cavities 5 may differ in their geometric shape and therefore also optical segments 12 may differ in their geometric shape, so for example shapes of at least some reflective surfaces 14 may mutually differ and/or at least some reflective surfaces 14 may mutually differ in their length d, whereas directions of individual axes α parallel to individual rear surfaces 4, or the rear side 16 of the light-guiding optical part 1 and directions of axes β of luminous fluxes 11 may also be different for individual optical segments 12.

Now, back to FIG. 2 in detail. As shown in this figure, the luminous flux 11 created by the light source 7 enters the optical segment 12 in the direction of axis β of the luminous flux 11 with a dispersion γ of light beams 10. A part of light beams 10 of the luminous flux 11 is reflected from the reflective surface 14 towards the output surface 6. Another part of light beams 10 is emitted directly towards the output surface 6, without light beams 10 falling on any of the reflective surfaces 14. A part of light beams 10 is dispersed by dispersive elements 3, which are preferably situated in the inner structure 2 of the light-guiding optical part 1 (FIG. 1 through 3 show suitable embodiments with dispersive elements 3, however these need not be contained in the inner structure 2) to ensure homogeneous light intensity of light beams 10 exiting the light-guiding optical part 1 through the output surface 6. A total optical system efficiency and required homogeneity of light beams 10 exiting through the output area 6 outside the light-guiding optical part 1 can be changed by increasing/decreasing the content of dispersive elements 3 which volumetrically disperse light beams 10, and/or by changing the size/length d of reflective surfaces 14.

The present invention is not limited to the embodiments described and shown above, which only represent examples of numerous possible embodiments of the invention. As indicated above, such embodiments are possible, in which the inner structure 2 does not contain dispersive elements 3. Furthermore, the invention also considers embodiments, for example, whose shape of reflective surfaces 14 differs from the shape of reflective surfaces 14 in the example shown in figures attached. Reflective surfaces 14 of the pair earmarking the optical segment 12 can be of mutually different or identical shape, which may be, by example, planar, cup-shaped, angular, comprising several different mutually continuing shapes, etc. The invention also includes other modifications and adjustments which are included in the scope of below-given patent claims.

LIST OF REFERENCE MARKS

1—light-guiding optical part
2—inner structure
3—dispersive elements
4—rear surface
5—macroscopic cavity
6—output surface
7—light source
8—lighting device
9—carrier
10—light beam
11—luminous flux
12—optical segment
14—reflective surface 15—focal point
16—rear side
t—thickness
d—length
X—optical axis
γ—dispersion
α—axis
β—axis

The invention claimed is:

1. An optical system for a lighting device comprising a plate-like shaped light-guiding optical part configured for spreading light beams generated by light sources situated opposite to a rear side of the optical part, through which rear side light beams are coupled into the light-guiding optical part, and after passing through the light-guiding optical part the light beams are emitted through its output surface,
   wherein the rear side of the light-guiding optical part is equipped with macroscopic cavities, each pair of adjacent macroscopic cavities forming between themselves a first optical segment,
   wherein the first optical segment comprises a first side surface, a second side surface, and a rear surface that lies on the rear side of the optical part and connects the first side surface and the second side surface,
   wherein the first side surface comprises a first reflective surface and the second side surface comprises a second reflective surface,
   wherein a light source is positioned opposite to and spaced apart from the rear surface so that a first portion of the light beams from the light source falls directly on the first reflective surface after passage through the rear surface,
   wherein a second portion of the light beams from the light source falls directly on the second reflective surface after passage through the rear surface,
   wherein, after passage through the rear surface, a third portion of the light beams from the light source falls directly on the output surface without having been reflected by either of the first reflective surface or the second reflective surface,
   wherein, when viewed from inside of the first optical segment, the first reflective surface comprises a concave shape and the second reflective surface comprises a convex shape or a planar shape, and
   wherein the rear surface has a planar shape.

2. The optical system according to claim 1, wherein the light-guiding optical part comprises dispersive elements for diffusion dispersion in its inner structure.

3. The optical system according to claim 1, wherein the second reflective surface comprises the convex shape.

4. The optical system according to claim 3, wherein the light source is situated in a source focal point of the concave shape of the first reflective surface, to which the light source is assigned.

5. The optical system according to claim 1, wherein opposite to the rear surface there is just one light source positioned for emitting a luminous flux of light beams within dispersion limits from a longitudinal axis of the luminous flux.

6. The optical system according to claim 1, wherein the optical system comprises a plurality of optical segments, wherein the rear surface of the first optical segment lies in a plane which is not perpendicular to an optical axis or a longitudinal axis of at least any luminous flux emitted by the light source not perpendicular to the optical axis.

7. The optical system according to claim 1, wherein the optical system comprises a plurality of optical segments, wherein the reflective surface of the first optical segment is inclined towards a longitudinal axis of a luminous flux emitted by the light source to the first optical segment, so that after refraction on the output surface, the light beams are directed in a direction of an optical axis or in a direction close to the direction of the optical axis.

8. The optical system according to claim 1, wherein the optical system comprises a plurality of optical segments, wherein all the optical segments are of the same shape and size, and a longitudinal axis of luminous fluxes emitted by a plurality of light sources to all optical segments have identical direction.

9. The optical system according to claim 8, wherein rear surfaces of all the optical segments lie in the same plane.

10. The optical system according to claim 8, wherein the optical segments each comprise a rear surface, and the all the macroscopic cavities have the same width on their entire length.

11. The optical system according to claim 1, wherein the optical system comprises a plurality of optical segments, wherein the first optical segment differs from some of the other optical segments in its shape and/or its size.

12. The optical system according to claim 1, wherein the optical system comprises a plurality of optical segments, wherein the first optical segment differs from some of the other optical segments based on a length of the reflective surface, a direction of a plane in which the rear surface of the first optical segment is situated, a shape of the first reflective surface, a shape of the second reflective surface, or a direction of a longitudinal axis of a luminous flux emitted by the light source.

* * * * *